United States Patent
Ko et al.

(10) Patent No.: US 8,983,180 B2
(45) Date of Patent: Mar. 17, 2015

(54) METHOD OF DETECTING SMOKE OF FOREST FIRE USING SPATIOTEMPORAL BOF OF SMOKE AND RANDOM FOREST

(71) Applicant: Industry Academic Cooperation Foundation Keimyung University, Daegu (KR)

(72) Inventors: ByoungChul Ko, Daegu (KR); JaeYeal Nam, Daegu (KR); Jun Oh Park, Daegu (KR)

(73) Assignee: Industry Academic Cooperation Foundation Keimyung University, Daegu (KR)

( * ) Notice: Subject to any disclaimer, the term of this patent is extended or adjusted under 35 U.S.C. 154(b) by 51 days.

(21) Appl. No.: 14/043,072

(22) Filed: Oct. 1, 2013

(65) Prior Publication Data
US 2014/0099020 A1 Apr. 10, 2014

(30) Foreign Application Priority Data
Oct. 5, 2012 (KR) .......... 10-2012-0110959

(51) Int. Cl.
*G06K 9/62* (2006.01)
*G06K 9/00* (2006.01)

(52) U.S. Cl.
CPC .......... *G06K 9/6262* (2013.01); *G06K 9/00335* (2013.01); *G06K 9/00664* (2013.01)
USPC ........................................... 382/159

(58) Field of Classification Search
CPC .............. G06K 9/6262; G06K 9/6263; G06K 9/00664; G06K 9/00335; G06K 2209/21; G06K 9/00268; G06K 9/00288
See application file for complete search history.

(56) References Cited

U.S. PATENT DOCUMENTS

| | | | |
|---|---|---|---|
| 7,286,704 B2 * | 10/2007 | Pfefferseder et al. | 382/181 |
| 2004/0052418 A1 * | 3/2004 | DeLean | 382/209 |
| 2013/0094699 A1 * | 4/2013 | Ko et al. | 382/103 |

* cited by examiner

*Primary Examiner* — Brian Le
(74) *Attorney, Agent, or Firm* — Jefferson IP Law, LLP

(57) ABSTRACT

A method of detecting the smoke of a forest fire using the spatiotemporal Bag-of-Features (BoF) of the smoke and a random forest is provided. In the method, whenever each frame of a video sequence is input, a difference between the input frame and a previous frame is detected, and the input frame is set as a key frame if the difference exceeds a predetermined first threshold value. One or more moving blocks are detected in the set key frame. One or more candidate smoke blocks are extracted from the moving blocks using a smoke color model. BoF representations are generated from the detected candidate smoke blocks. Whether smoke of the candidate smoke blocks is actual smoke is determined by performing random forest learning on the generated BoF representation.

16 Claims, 10 Drawing Sheets

METHOD OF DETECTING SMOKE OF FOREST FIRE USING SPATIOTEMPORAL BOF OF SMOKE AND RANDOM FOREST

CROSS-REFERENCE TO RELATED APPLICATION(S)

This application claims the benefit under 35 U.S.C. §119 (a) of a Korean patent application filed on Oct. 5, 2012 in the Korean Intellectual Property Office and assigned Serial No. 10-2012-0110959, the entire disclosure of which is hereby incorporated by reference.

TECHNICAL FIELD

The present disclosure relates to a method of detecting the smoke of a forest fire. More particularly, the present disclosure relates to a method of detecting the smoke of a forest fire using the spatiotemporal Bag-of-Features (BoF) of the smoke and a random forest.

BACKGROUND

Among various natural disasters, such as storms, drought, floods, landslides and tsunamis (seismic sea waves), forest fires rank high as a natural disaster that causes huge losses of both life and property and generates ecological problems. Accordingly, an early warning of a forest fire is crucial for a reduction in the possible loss of both life and property. Recently, thanks to the rapid advancement of information technology, automatic forest fire detection has become a new research field.

A conventional method for detecting a forest fire is to detect a fire or smoke with the naked eye. Currently, in order to overcome the problems of the conventional method, Infrared (IR) sensors and a Light Detection And Ranging (LIDAR) system are used. They detect a forest fire by detecting the heat flux of flame light and measuring laser light generated by back scattering via smoke particles. However, this optical sensor-based forest fire detection method is problematic in that many erroneous warnings are issued because of atmospheric conditions or the reflection of light, and in that there is a large distance between a sensor and the starting point of a fire. Recently, a forest fire detection method using a Charge-Coupled Device (CCD) camera has been widely used because of the advantages in which equipment and management costs are low, a single camera can cover a wide range, the response time for the detection of a fire and smoke is short, and an administrator can detect a fire and also monitor the states of flame and smoke without visiting a corresponding location. However, this method still has the problems of an illuminance environment, variations in the color of smoke, and low-quality outdoor space images.

In general, the detection of a forest fire may be divided into two categories: smoke detection and flame detection. Since, during the development of a forest fire, smoke is generated prior to flame, it is particularly important to rapidly and accurately detect smoke in order to issue an early warning of a forest fire. Currently, various methods for detecting smoke have been researched.

Töreyin and Cetin proposed a part-based smoke detection algorithm using four sub-algorithms (see B. U. Töreyin and A. E. Cetin, "Wildfire Detection using LMS based Active Learning," IEEE International Conference on Acoustics, Speech and Signal Processing, 1461-1464, 2009). That is, in this algorithm, four sub-algorithms, including (a) a sub-algorithm for detecting a slow-moving video object, (b) a sub-algorithm for detecting a gray region, (c) a sub-algorithm for detecting a rising object, and (d) a sub-algorithm for removing a shadow, separately detect the presence of smoke, and the determinations of the sub-algorithms are combined with each other by an adaptive weighted majority algorithm.

Ham et al. proposed an algorithm for detecting the smoke of a forest fire using Fuzzy Finite Automata (FFA) and visual features (see S. J. Ham, B. C. Ko, and J. Y. Nam, "Vision based Forest Smoke Detection using Analyzing of Temporal Patterns of Smoke and their Probability Models," Image Processing: Machine Vision Applications IV, 7877:1-6, 2011).

However, the above proposed methods are problematic in that they confuse a moving object, such as a moving cloud or a swaying tree, with smoke, thus frequently resulting in the case in which they cannot accurately detect actual smoke and thus provide false information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of detecting the smoke of a forest fire using the spatiotemporal Bag-of-Features (BoF) of the smoke and a random forest, which is configured to set one or more key frames from a video sequence, to extract one or more candidate smoke blocks using a nonparametric smoke color model, to extract a Histogram Of Gradient (HOG) and a Histogram of Optical Flow (HOF) from the extracted candidate smoke blocks, to generate BoF representations, that is, spatiotemporal features, from the HOG and the HOF, and to perform random forest learning on the generated BoF representations, thereby proving the ability to detect the smoke of a forest fire in real time and to accurately detect the smoke of the forest fire while reducing erroneous warnings.

In accordance with an aspect of the present disclosure, a method of detecting smoke of a forest fire using spatiotemporal Bag-of-Features (BoF) of the smoke and a random forest is provided. The method includes the steps of:

(1) whenever each frame of a video sequence is input, detecting a difference between the input frame and a previous frame, and setting the input frame as a key frame if the difference exceeds a predetermined first threshold value;

(2) detecting one or more moving blocks in the set key frame;

(3) extracting one or more candidate smoke blocks from the moving blocks using a smoke color model;

(4) generating BoF representations from the detected candidate smoke blocks; and (5) determining whether smoke of the candidate smoke blocks is actual smoke by performing random forest learning on the generated BoF representation.

The method may further include, before step (1), the preprocessing of dividing the frame of the video sequence into a plurality of blocks.

The preprocessing step may include dividing the frame of the video sequence into 32×24 blocks.

Step (3) may include the steps of:

(3-1) generating a nonparametric probability density function step for each of the moving blocks in a saturation and intensity color space using a Gaussian kernel-based density estimation method;

(3-2) calculating a likelihood of a feature vector of the moving block based on the nonparametric probability density function; and (3-3) if the likelihood exceeds a predetermined second threshold value, determining the moving block to be a candidate smoke block.

The method may further include grouping determined candidate smoke blocks into a cluster by connecting the determined candidate smoke blocks with each other.

The nonparametric probability density function may be a multimodal probability density function.

Once all clusters have been determined at step (3-4), one or more clusters having three or fewer blocks may be eliminated.

Step (4) may include the steps of:

(4-1) generating 3D volumes by combining the candidate smoke blocks with blocks of a previous frame corresponding to the candidate smoke blocks;

(4-2) extracting local spatiotemporal features from the generated 3D volumes;

(4-3) generating a codebook by clustering the extracted local spatiotemporal features; and (4-4) generating BoF histograms using the generated codebook.

Step (4-2) may include the steps of:

(4-2-1) generating a histogram of gradient (HOG) from a current block; and (4-2-2) generating a histogram of optical flow (HOF) from 100 blocks.

Step (4-2) may further include step (4-2-3) of normalizing and connecting the generated HOG and HOF.

Step (4-4) may include the step of generating two BoF histograms for smoke and non-smoke classes, respectively.

The HOG and the HOF may be generated based on a fact that a diffusion direction of smoke rises because of a thermal convection phenomenon.

Step (5) may include the steps of:

(5-1) selecting the maximum tree depth of decision trees; and (5-2) growing the decision trees.

Step (5) may further include the step of calculating the average of distribution probabilities of all the trees.

Step (5-2) may include the steps of:

(5-2-1) selecting new bootstrap samples from a training set, and growing each unpruned tree using the bootstrap samples;

(5-2-2) allowing each internal node of the tree to randomly select variables, and determining a best split function using only the selected variables; and (5-2-3) growing the tree to the maximum tree depth.

The number of decision trees may be 100.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, throughout the specification, when an element is referred to as being "connected" or "coupled" to another element, it may be directly connected or coupled to the other element or intervening elements may be present. Furthermore, the terms "includes," "including," "comprises" and "comprising" do not exclude one or more other elements but may include one or more other elements, unless the context clearly indicates otherwise.

Figure 1:
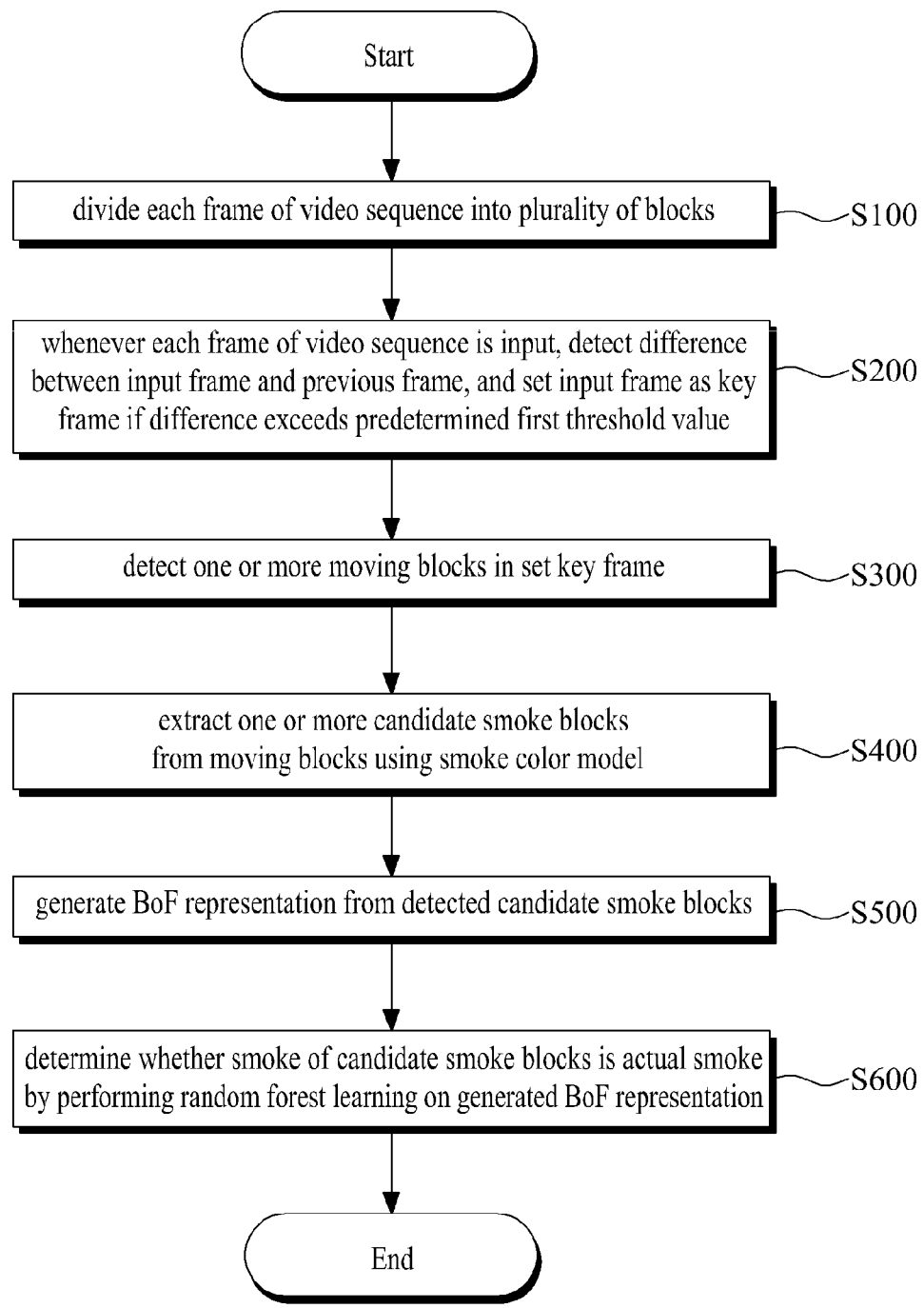
FIG. 1 is a flowchart illustrating a method of detecting the smoke of a forest fire using the spatiotemporal Bag-of-Features (BoF) of the smoke and a random forest according to an embodiment of the present disclosure.

FIG. 1 is a flowchart of a method of detecting the smoke of a forest fire using the spatiotemporal Bag-of-Features (BoF) of the smoke and a random forest according to an embodiment of the present disclosure.

As illustrated in FIG. 1, the method of detecting the smoke of a forest fire using the spatiotemporal BoF of the smoke and a random forest according to this embodiment of the present disclosure may include preprocessing operation S100 of dividing each frame of a video sequence into a plurality of blocks; operation S200 of, whenever each frame of the video sequence is input, detecting a difference between the input frame and a previous frame, and setting the input frame as a key frame if the difference exceeds a predetermined first threshold value, operation S300 of detecting one or more moving blocks in the set key frame, operation S400 of extracting one or more candidate smoke blocks from the moving blocks using a smoke color model, operation S500 of generating BoF representations from the detected candidate smoke blocks, and operation S600 of determining whether the smoke of the candidate smoke blocks is actual smoke by performing random forest learning on the generated BoF.

At operation S100, each frame that constitutes the input video sequence is divided into the plurality of blocks in order to process the input video sequence in real time. More specifically, it is preferable to divide the frame into 32×24 blocks in accordance with the length and width ratio of the MPEG standards. With this, subsequent operations may be performed on a block basis.

At operation S200, the key frame is selected from the video sequence, the frame of which has been divided into the plurality of blocks at operation S100. One of the principal features of the smoke of a forest fire is a diffusion speed that seems to be relatively slow. The reason for this is that a surveillance camera for monitoring the smoke of a forest fire is installed at a distant location. Accordingly, when a difference image is generated for each frame using a conventional simple background subtraction modeling method, a problem arises in that movement is rarely detected because of the feature of slow movement. To overcome this problem, at operation S200, whenever each frame of the video sequence is input, a difference between the input frame and a previous frame is detected, and the current input frame is set as the key frame if the difference exceeds the predetermined first threshold value. At subsequent operations, feature values are extracted only from key frames and then the smoke of the forest fire is detected.

At operation S300, the moving blocks are detected from the key frame that has been set at operation S200.

At operation S400, the candidate smoke blocks are extracted from the moving blocks detected at operation S300 using a smoke color model. Operation S400 will be described in detail with reference to FIGS. 2 to 4.

Figure 2:
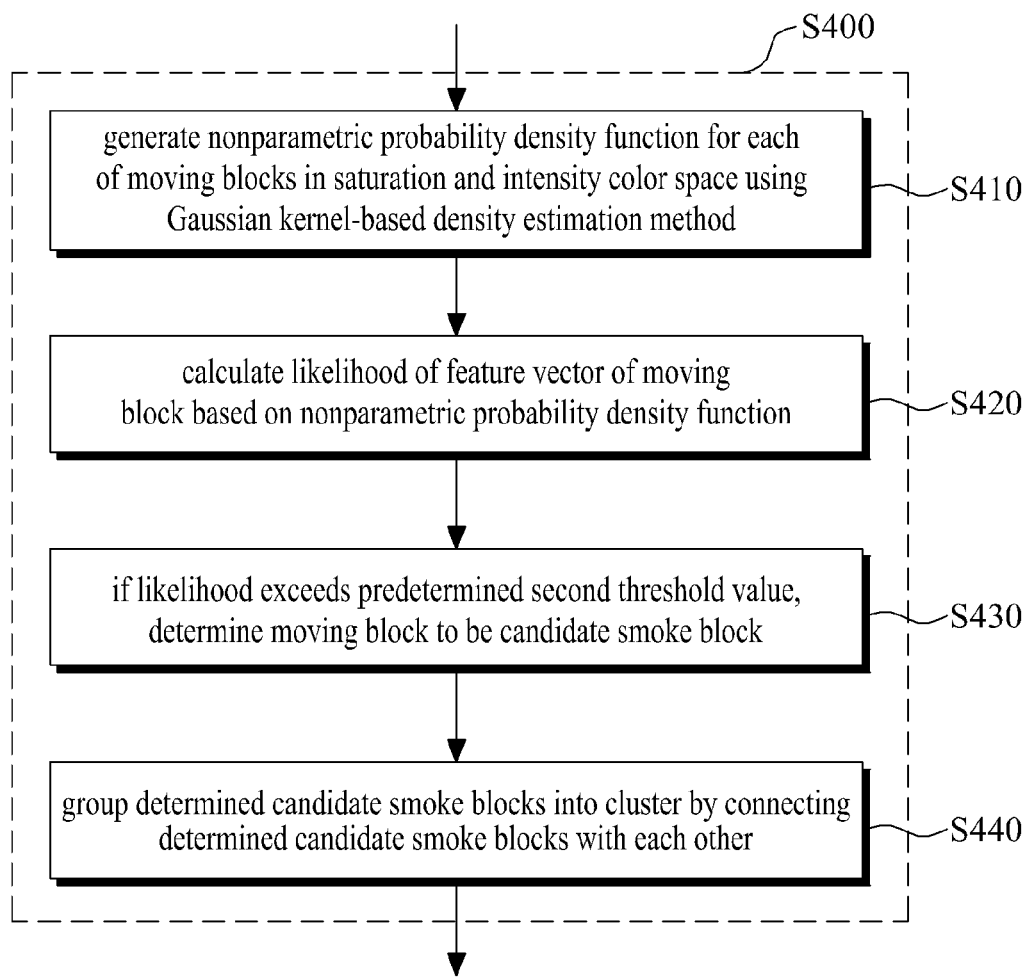
FIG. 2 is a detailed flowchart illustrating operation S400 of the method of detecting the smoke of a forest fire using the spatiotemporal BoF of the smoke and a random forest according to an embodiment of the present disclosure.
Figure 3:
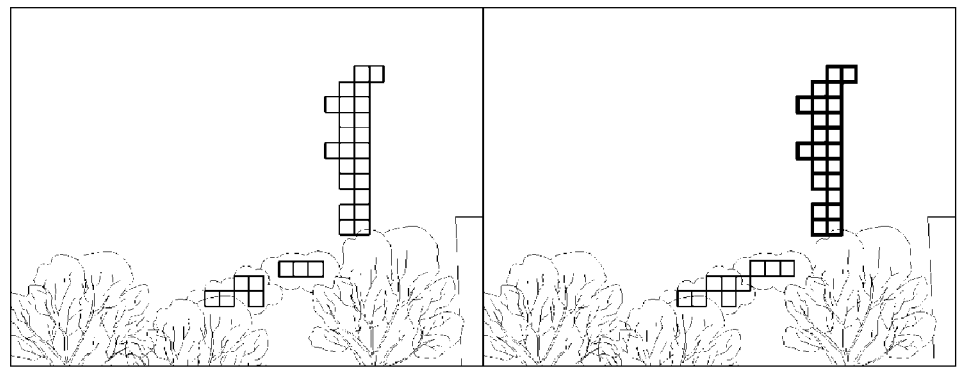
FIG. 3 is a diagram illustrating a state in which candidate smoke blocks have been determined at operation S400 of the method of detecting the smoke of a forest fire using the spatiotemporal BoF of the smoke and a random forest according to the embodiment of the present disclosure.

FIG. 2 is a detailed flowchart illustrating operation S400 of the method of detecting the smoke of a forest fire using the spatiotemporal BoF of the smoke and a random forest according to an embodiment of the present disclosure, and FIG. 3 is a diagram illustrating a state in which candidate smoke blocks have been determined at operation S400 of the method of detecting the smoke of a forest fire using the spatiotemporal BoF of the smoke and a random forest according to the embodiment of the present disclosure.

As illustrated in FIG. 2, operation S400 of the method of detecting the smoke of a forest fire using the spatiotemporal BoF of the smoke and a random forest according to the embodiment of the present disclosure may include operation S410 of generating a nonparametric probability density function for each of the moving blocks in the saturation and intensity color space using a Gaussian kernel-based density estimation method; operation S420 of calculating the likelihood of the feature vector of the moving block from the nonparametric probability density function; and operation S430 of, if the likelihood exceeds a predetermined second threshold value, determining the corresponding moving block to be a candidate smoke block. Operation S400 may further include operation S440 of grouping determined candidate smoke blocks into a cluster by connecting the determined candidate smoke blocks with each other.

At operation S410, the nonparametric probability density function is generated for each of the moving blocks in the saturation and intensity color space using the Gaussian kernel-based density estimation method. After the key frames and the moving blocks have been detected at operations S200 and S300, one or more non-smoke-colored blocks should be filtered out from among the moving blocks in order to reduce the calculation time it takes to determine whether smoke in question is actual smoke. Generally, the color of smoke varies depending on a material being burnt, so that when the color of smoke is analyzed in the RGB color space, it is widely distributed throughout the entire space. In contrast, in the HSI color space, the color of smoke is distributed in low saturation, high intensity and no hue regions.

Figure 4:
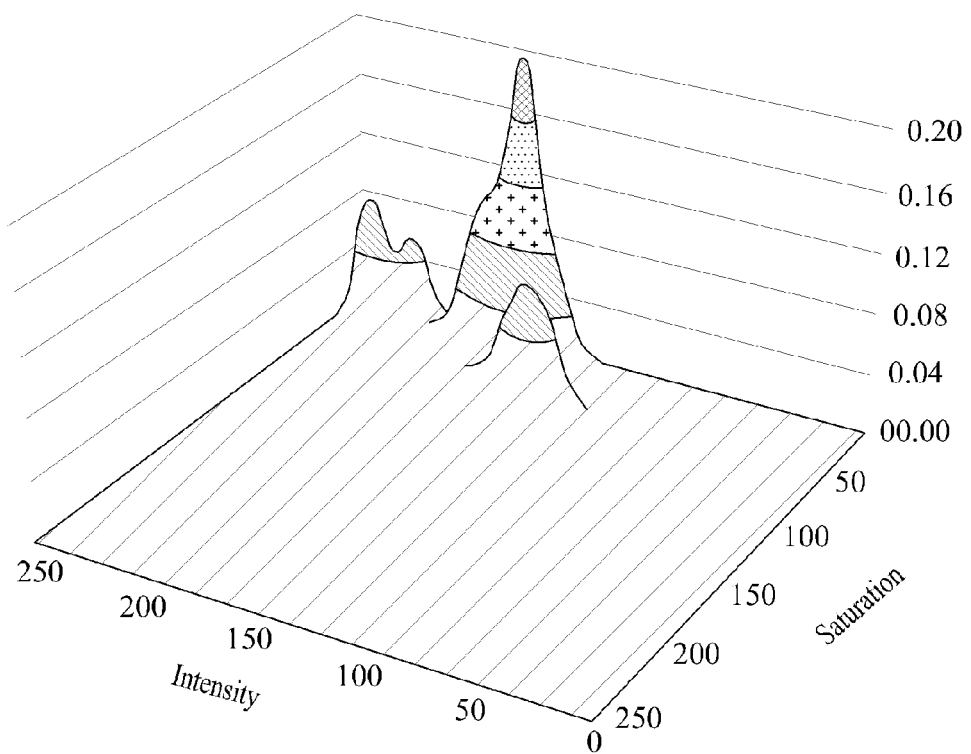
FIG. 4 is a diagram illustrating a state in which a probability density function has been generated in the saturation and intensity color space at operation S410 of the method of detecting the smoke of a forest fire using the spatiotemporal BoF of the smoke and a random forest according to an embodiment of the present disclosure.

Accordingly, at operation S410, the probability density function is generated for the moving block in the saturation and intensity color space, and the non-smoke-colored blocks are deleted. FIG. 4 is a diagram illustrating a state in which a probability density function has been generated in the saturation and intensity color space at operation S410 of the method of detecting the smoke of a forest fire using the spatiotemporal BoF of the smoke and a random forest according to an embodiment of the present disclosure.

As illustrated in FIG. 4, the probability density function is not a unimodal density function but a multimodal density function, is generated using a Gaussian kernel-based density estimation method, that is, a nonparametric method, and may be expressed by the following Equation (1):

$$p(x) = \frac{1}{N} \sum_{n=1}^{N} \frac{1}{(2\pi h^2)^{d/2}} \exp\left(-\frac{\|x - x_n\|^2}{2h^2}\right) \quad \text{Equation (1)}$$

where N is the number of pieces of data, and h is a parameter that determines the width of an effective Gaussian window depending on each dimension d.

At operation S420, the likelihood of the feature vector of the moving block is calculated from the nonparametric probability density function generated at operation S410. The likelihood may be expressed by $p(b_i/\text{Smoke})$. More specifically, the likelihood is calculated by adding the probabilities of all pixels in block $b_i$, and may be expressed by the following Equation (2):

$$b_i = \begin{cases} 1 & \text{if } \sum_{j=1}^{n} p(b_j | \text{Smoke}) \geq T_1 \\ 0 & \text{otherwise} \end{cases} \quad \text{Equation (2)}$$

At operation S430, if the likelihood calculated at operation S420 exceeds the predetermined second threshold value, the corresponding moving block is determined to be a candidate smoke block.

At operation S440, the candidate smoke blocks determined at operation S430 are grouped into a cluster by connecting them with each other. That is, once the candidate smoke blocks have been determined, images are scanned such that they can be grouped into a cluster based on the connection of blocks. Meanwhile, once all N clusters have been determined, one or more clusters having three or fewer blocks may be eliminated.

At operation S500, the BoF representations are generated from the candidate smoke blocks detected at operation S400. Operation S500 will be described in detail below with reference to FIGS. 5 to 7.

Figure 5:
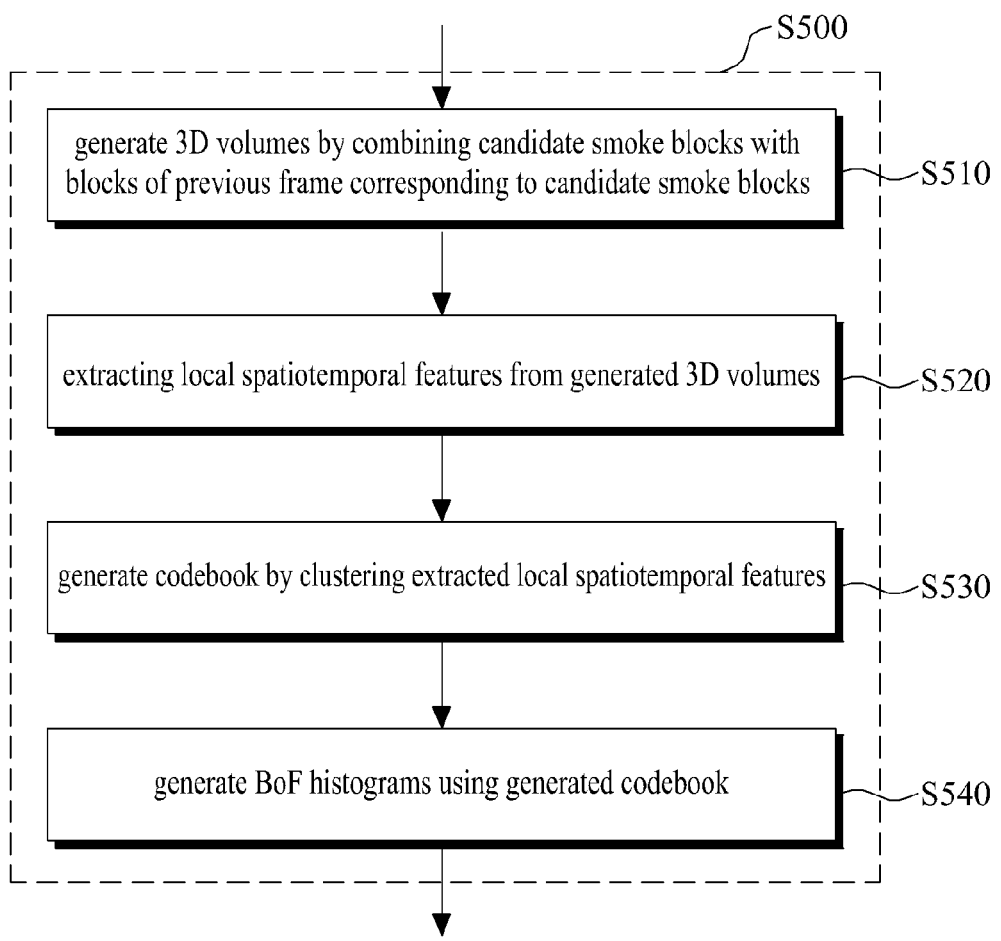
FIG. 5 is a detailed flowchart illustrating operation S500 of the method of detecting the smoke of a forest fire using the spatiotemporal BoF of the smoke and a random forest according to an embodiment of the present disclosure.
Figure 6:
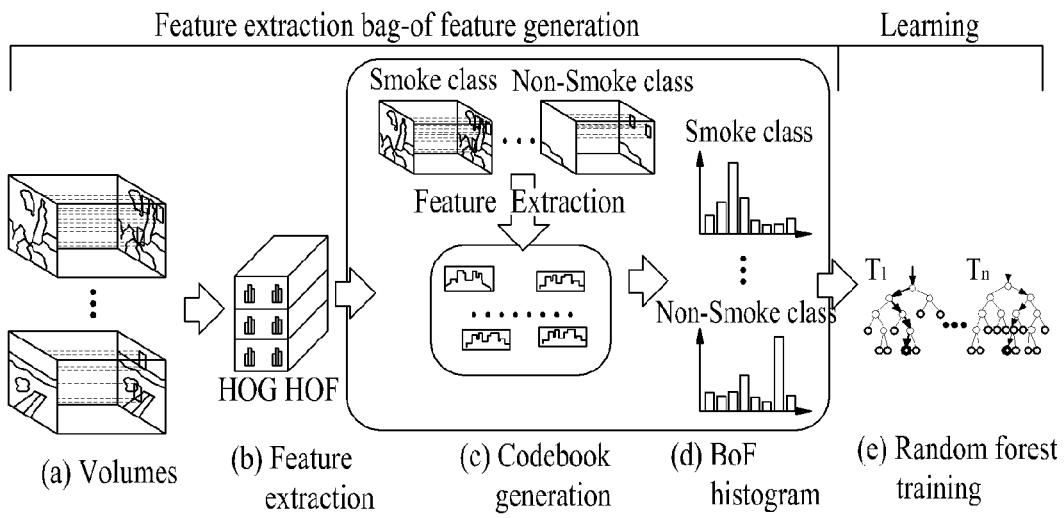
FIG. 6 is a diagram illustrating processing results that are obtained at operations S510 to S540 of the method of detecting the smoke of a forest fire using the spatiotemporal BoF of the smoke and a random forest according to an embodiment of the present disclosure.

FIG. 5 is a detailed flowchart illustrating operation S500 of the method of detecting the smoke of a forest fire using the spatiotemporal BoF of the smoke and a random forest according to an embodiment of the present disclosure, and FIG. 6 is a diagram illustrating processing results that are obtained at operations S510 to S540 of the method of detecting the smoke of a forest fire using the spatiotemporal BoF of the smoke and a random forest according to an embodiment of the present disclosure. As illustrated in FIG. 5, operation S500 of the method of detecting the smoke of a forest fire using the spatiotemporal BoF of the smoke and a random forest according to the embodiment of the present disclosure may include operation S510 of generating 3D volumes by combining the candidate smoke blocks with blocks of a previous frame corresponding to the candidate smoke blocks; operation S520 of extracting local spatiotemporal features from the generated 3D volumes; operation S530 of generating a codebook by clustering the extracted local spatiotemporal features; and operation S540 of generating BoF histograms using the generated codebook.

At operation S510, 3D the volume volumes are generated by combining the candidate smoke blocks with the blocks of the previous frame corresponding to the candidate smoke blocks, as illustrated in (a) of FIG. 6. In this case, each of the volumes $\Delta x$, $\Delta y$, and $\Delta z$ has the same width and height as each of the candidate blocks 10, and time $\Delta t$ is 100.

At operation S520, local spatiotemporal features are extracted from the 3D volumes generated at operation S510.

Figure 7:
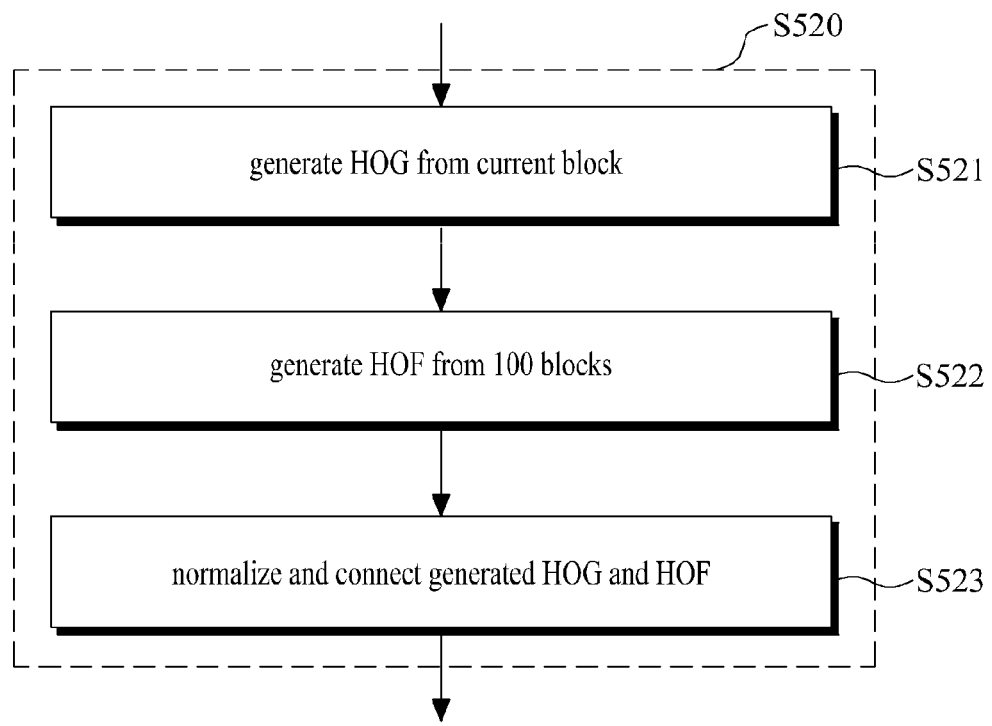
FIG. 7 is a detailed flowchart illustrating operation S520 of the method of detecting the smoke of a forest fire using the spatiotemporal BoF of the smoke and a random forest according to an embodiment of the present disclosure.

FIG. 7 is a detailed flowchart illustrating operation S520 of the method of detecting the smoke of a forest fire using the spatiotemporal BoF of the smoke and a random forest according to an embodiment of the present disclosure. As illustrated in FIG. 7, operation S520 of the method of detecting the smoke of a forest fire using the spatiotemporal BoF of the smoke and a random forest according to the embodiment of the present disclosure may include operation S521 of generating a Histogram Of Gradient (HOG) from a current block; operation S522 of generating a Histogram of Optical Flow (HOF) from 100 blocks; and operation S523 of normalizing and connecting the generated HOG and HOF.

At operation S521, the HOG is generated from the current block. Since the diffusion direction of smoke rises because of thermal convection, the gradient distribution of smoke boundaries has a distinguishable pattern. Based on this characteristic, at operation S521, the HOG, that is, spatial features, is generated from the current block. Meanwhile, in order to generate an HOG from the candidate blocks, a gradient direction is estimated from each pixel, and a histogram of respective directions of the candidate blocks is calculated using a method similar to that described in "B. C. Ko, J. Y. Kwak, and J. Y. Nam, "Wildfire Smoke Detection using Temporal-spatial Features and Random forest classifiers," Optical Engineering, 51 1:017208-1-017208-10, 2012," a detailed description of which is omitted.

At operation S522, the HOF is generated from the 100 blocks as temporal features. That is, since the diffusion direction of smoke continuously rises because of thermal convection, the direction of motion is estimated from the 100 blocks of each volume.

At operation S523, the HOG and HOF generated at operation S521 and S522 are normalized and connected with each other, with the result that local spatiotemporal features are extracted, as illustrated in (b) of FIG. 6.

At operation S530, a codebook is generated by clustering the local spatiotemporal features extracted at operation S520. In greater detail, when random subsets of a volume including smoke and non-smoke regions are considered from a training set, a codebook, that is, visual vocabularies, is generated using training descriptors and k-means clustering, in which case it is preferable to determine the size k of the visual vocabularies to be 400, as illustrated in (c) of FIG. 6. The clusters are processed as respective visual words of the visual vocabularies, and local features of images are mapped to visual vocabularies, with the result that the images may be described with feature histograms depending on the presence of the visual words.

At operation S540, BoF histograms are generated using the codebook generated at operation S530, as illustrated in (d) of FIG. 6. More specifically, respective features are assigned to the closest visual words, and histograms of the presence (occurrence) of visual words are calculated beyond spatiotemporal volumes, with the result that BoF histograms for smoke and non-smoke classes are generated. In order to assign weights to histograms, binary weights represent the presence of a visual word and the absence of a visual word by means of values 1 and 0, respectively. Meanwhile, in order to emphasize the significance of visual words, it is preferable to adopt a soft-weighting approach that does not search for only the closest visual word but selects the closest visual word and assigns a varying weight depending on the sum of distances.

At operation S600, whether the smoke of the candidate smoke blocks is actual smoke is determined by performing random forest learning on the BoF representations generated at operation S500.

A random forest is a decision tree ensemble classifier that has trees that have been grown using a few types of randomization. A random forest is a set of binary decision trees rather than a single decision tree. A random forest is based on a top-down scheme, and has a fast training speed based on decision trees and a capacity to process a large amount of data.

Operation S600 will be described in detail below with reference to FIGS. 8 to 10.

Figure 8:
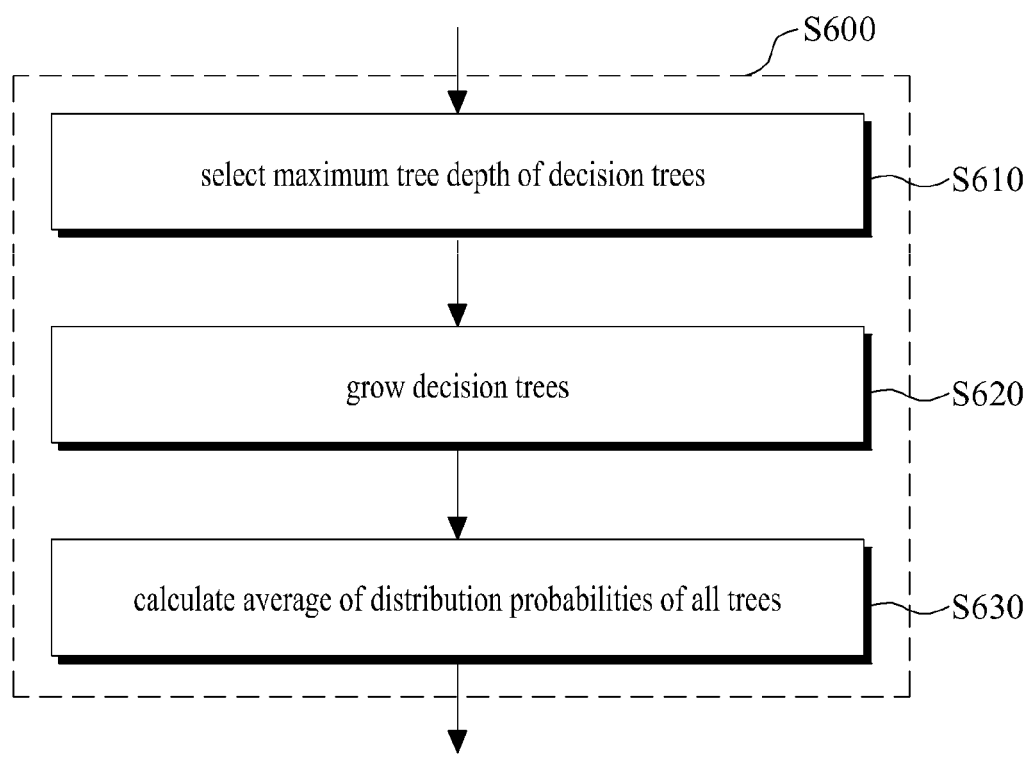
FIG. 8 is a detailed flowchart of operation S600 of the method of detecting the smoke of a forest fire using the spatiotemporal BoF of the smoke and a random forest according to an embodiment of the present disclosure.
Figure 9:
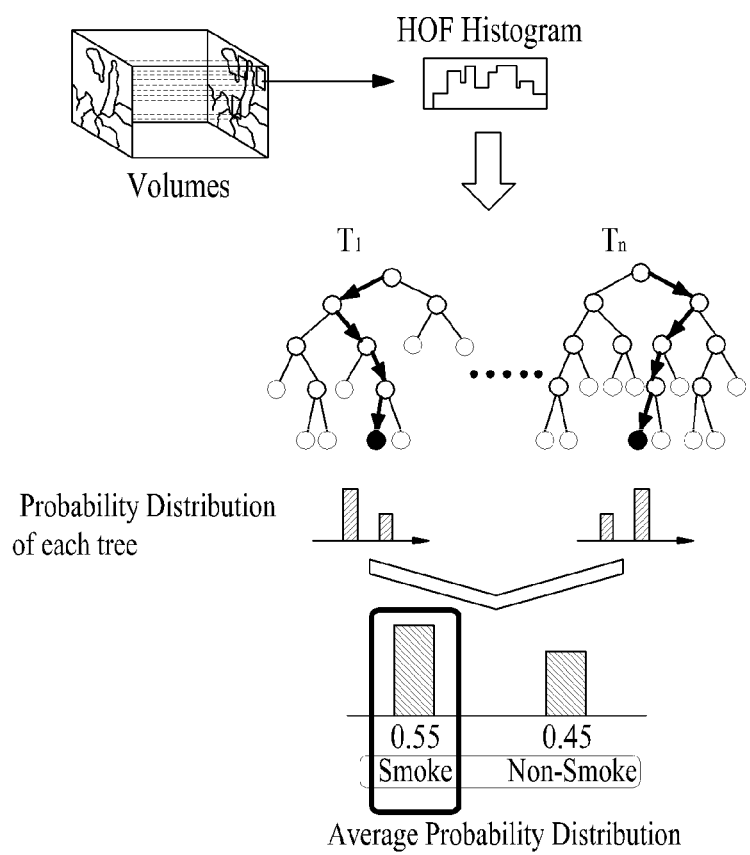
FIG. 9 is a diagram illustrating a processing state that is obtained at operation S600 of the method of detecting the smoke of a forest fire using the spatiotemporal BoF of the smoke and a random forest according to the embodiment of the present disclosure.
Figure 10:
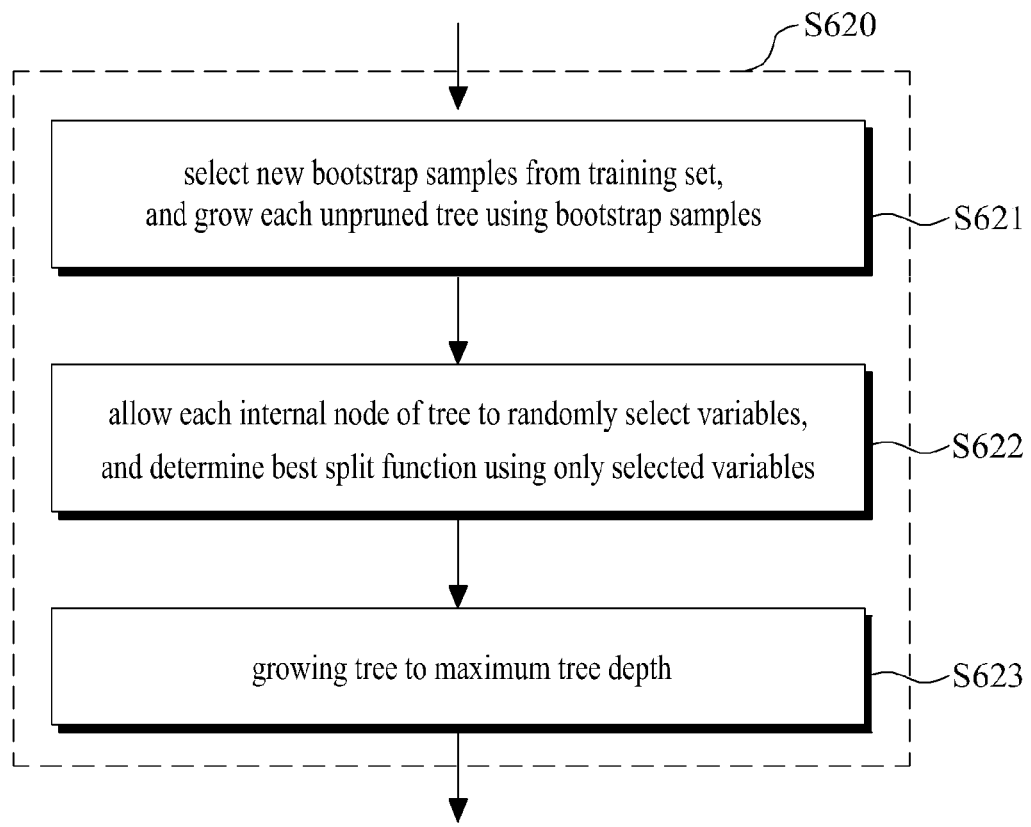
FIG. 10 is a detailed flowchart illustrating operation S620 of the method of detecting the smoke of a forest fire using the spatiotemporal BoF of the smoke and a random forest according to an embodiment of the present disclosure.

FIG. 8 is a detailed flowchart of operation S600 of the method of detecting the smoke of a forest fire using the spatiotemporal BoF of the smoke and a random forest according to an embodiment of the present disclosure, and FIG. 9 is a diagram illustrating a processing state that is obtained at operation S600 of the method of detecting the smoke of a forest fire using the spatiotemporal BoF of the smoke and a random forest according to the embodiment of the present disclosure. As illustrated in FIG. 8, operation S600 of the method of detecting the smoke of a forest fire using the spatiotemporal BoF of the smoke and a random forest according to the embodiment of the present disclosure may include operation S610 of selecting the maximum tree depth of decision trees; operation S620 of growing the decision trees; and operation S630 of calculating the average of distribution probabilities of all the trees.

At operation S610, the maximum tree depth of decision trees is selected. The random forest starts with the selection of subset I' from local BoF training data I. At node n, training data $I_n$ is repeatedly divided into left and right subsets $I_l$ and $I_r$ pursuant to the following Equation (3) including split function $f(v_i)$ of reference value t and feature vector v:

$$I_l = \{i \in I_n | f(v_i) < t\},$$

$$I_r = I_n \backslash I_l \quad \text{Equation (3)}$$

where reference value t is randomly selected within $$t \in \left(\min_i f(v_i), \max_i f(v_i)\right)$$

pursuant to split function $f(v_i)$.

At operation S620, the decision trees are grown. FIG. 10 is a detailed flowchart illustrating operation S620 of the method of detecting the smoke of a forest fire using the spatiotemporal BoF of the smoke and a random forest according to an embodiment of the present disclosure. As illustrated in FIG. 10, operation S620 of the method of detecting the smoke of a forest fire using the spatiotemporal BoF of the smoke and a random forest according to the embodiment of the present disclosure may include operation S621 of selecting new bootstrap samples from a training set, and growing each unpruned tree using the bootstrap samples; operation S622 of allowing each internal node of the tree to randomly select variables, and determining the best split function using only the selected variables; and operation S623 of growing the tree to the maximum tree depth.

At operation S621, new n bootstrap samples are selected from training set Sn, and each unpruned tree is grown using the bootstrap samples.

At operation S622, each internal node of the tree randomly selects m variables, and the best split function is determined using only the selected variables.

At operation S623, the tree is grown to the maximum tree depth. Once the decision trees have been trained, an ensemble of trees is created, as illustrated in FIG. 9. Meanwhile, it is preferred that the number of decision trees of the random forest be set to 100.

At operation S630, the average of the distribution probabilities of all the trees $L=(l_1, l_2, \ldots l_t)$ is obtained using the following Equation (4), through which a final class is selected:

$$P(c_i | L) = \frac{1}{T} \sum_{t=1}^{T} (c_i | l_t) \quad \text{Equation (4)}$$

In the above Equation (4), T is the number of trees, and $c_i$ is selected as the final class of an input image if $p(c_i/L)$ has the maximum value. For example, in FIG. 9, a corresponding test image has the maximum probability posterior probability, and is located within a smoke class.

Although the present disclosure will be described using the following experimental example in detail, the present disclosure is not limited to the following experimental example in any way:

Experimental Example 1

Experiment on Comparisons in ATPR, AFPR and AMR

In order to ascertain the smoke detection performance of the method of detecting the smoke of a forest fire according to an embodiment of the present disclosure through the comparisons in Average True Positive Rate (ATPR), Average False Positive Rate (AFPR) and Average Miss Rate (AMR), the following experiments were carried out.

The KMU Fire & Smoke database (http://cvpr.kmu.ac.kr/Dataset/Dataset.htm) including 38 various fire videos, such as "Indoor-Outdoor Flame," "Indoor-Outdoor Smoke," "Smoke of Forest Fire," "Moving Objects such as Smoke and Fire," etc., was used, the frame rates of video data vary between 15 and 30 Hz, and the sizes of input images are set to a uniform value of 320×240 pixels.

In order to perform training, a total of 517 blocks, including 130 blocks for dark smoke, 131 blocks for light smoke, 120 blocks for light cloud and fog, and 136 blocks for dark cloud and fog, were randomly selected from 10 videos. A training video sequence consisted of five videos including a video of the smoke of a forest fire and five videos including a video of cloud and fog.

The ATPR, AFPR and AMR values were calculated using the method of detecting the smoke of a forest fire according to the embodiment of the present disclosure. In contrast, in order to compare the smoke detection performance of the method of detecting the smoke of a forest fire according to the embodiment of the present disclosure, ATPR, AFPR and AMR values were calculated and compared with respect to the same sample using methods that were disclosed in "B. C. Ko, J. Y. Kwak, and J. Y. Nam, "Wildfire Smoke Detection using Temporal-spatial Features and Random Forest Classifiers," Optical Engineering, 51(1): 017208-1-017208-10, 2012" (hereinafter referred to as "Ko"), "B. U. Töreyin and A. E. Cetin, "Wildfire Detection using LMS Based Active Learning," IEEE International Conference on Acoustics, Speech and Signal Processing, 1461-1464, 2009" (hereinafter referred to as "Toreyin"), and "S. J. Ham, B. C. Ko, and J. Y. Nam, "Vision Based Forest Smoke Detection using Analyzing of Temporal Patterns of Smoke and Their Probability Models," Image Processing: Machine Vision Applications IV, 7877:16, 2011" (hereinafter referred to as "Ham"). The results of the comparisons are illustrated in FIG. 11.

Figure 11:
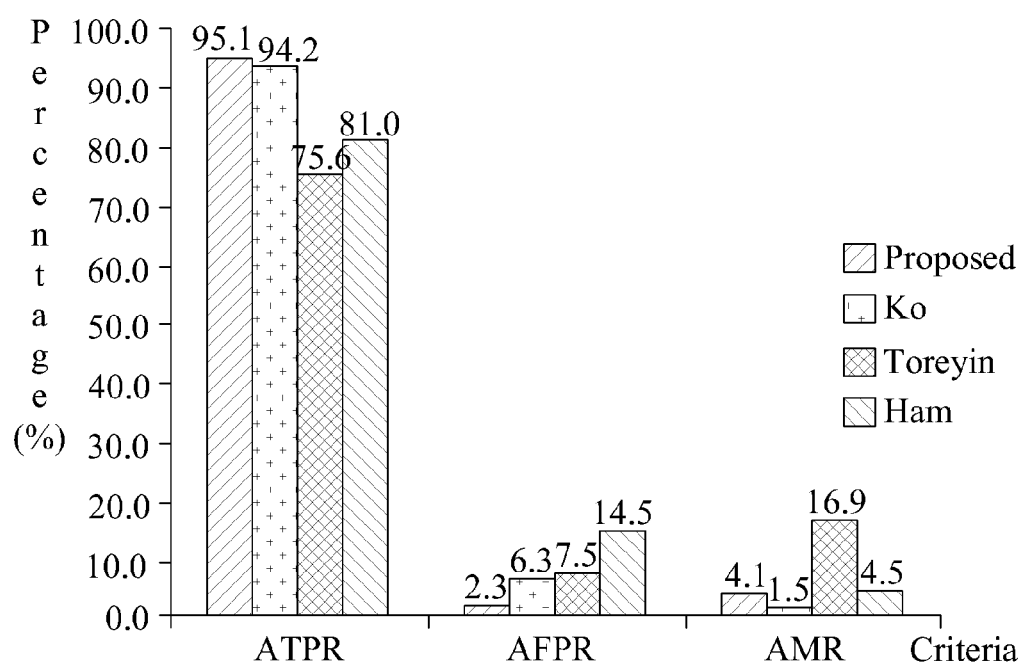
FIG. 11 is a diagram illustrating the results of comparative experiments with respect to the Average True Positive Rate (ATPR), Average False Positive Rate (AFPR) and Average Miss Rate (AMR) of a method of detecting the smoke of a forest fire using the spatiotemporal BoF of the smoke and a random forest according to an embodiment of the present disclosure.

As illustrated in FIG. 11, in the case of the ATPR, the method according to the present disclosure exhibited 95.1%, while "Ko", "Toreyin" and "Ham" exhibited 94.2%, 75.6% and 81.0%, respectively. Furthermore, in the case of the AFPR, the method according to the present disclosure exhibited 2.3%, while the other methods exhibited 6.3%, 7.5% and 14.5%, respectively. In the case of the AMR, the method according to the present disclosure exhibited 4.1%, while the other methods exhibited 1.5%, 16.9% and 4.5%, respectively. As a result, it can be concluded that the method of detecting smoke according to the embodiment of the present disclosure achieves superior smoke detection performance to the methods of "Ko," "Toreyin" and "Ham."

More specifically, the method of "Toreyin" achieved superior AMR results, and it is determined that the reason for this is that the candidate smoke regions of all frames had been detected using frame differences. However, the smoke of a forest is viewed as having moved very slowly because of the long distance between a fire camera and the location of smoke particularly in videos 1, 3 and 4, and thus it is determined that many actual smoke regions were missed. The method of "Ham" achieved a high AFPR of 14.5% with respect to the test videos. It is determined that the reason for the high error is that moving smoke was confused with a color object and a swaying tree was confused with smoke. Likewise, the method of "Toreyin" provided a few pieces of false information in connection with video 6, and it is determined that the reason for that is that a moving cloud was confused with the smoke of a fire.

Figure 12:
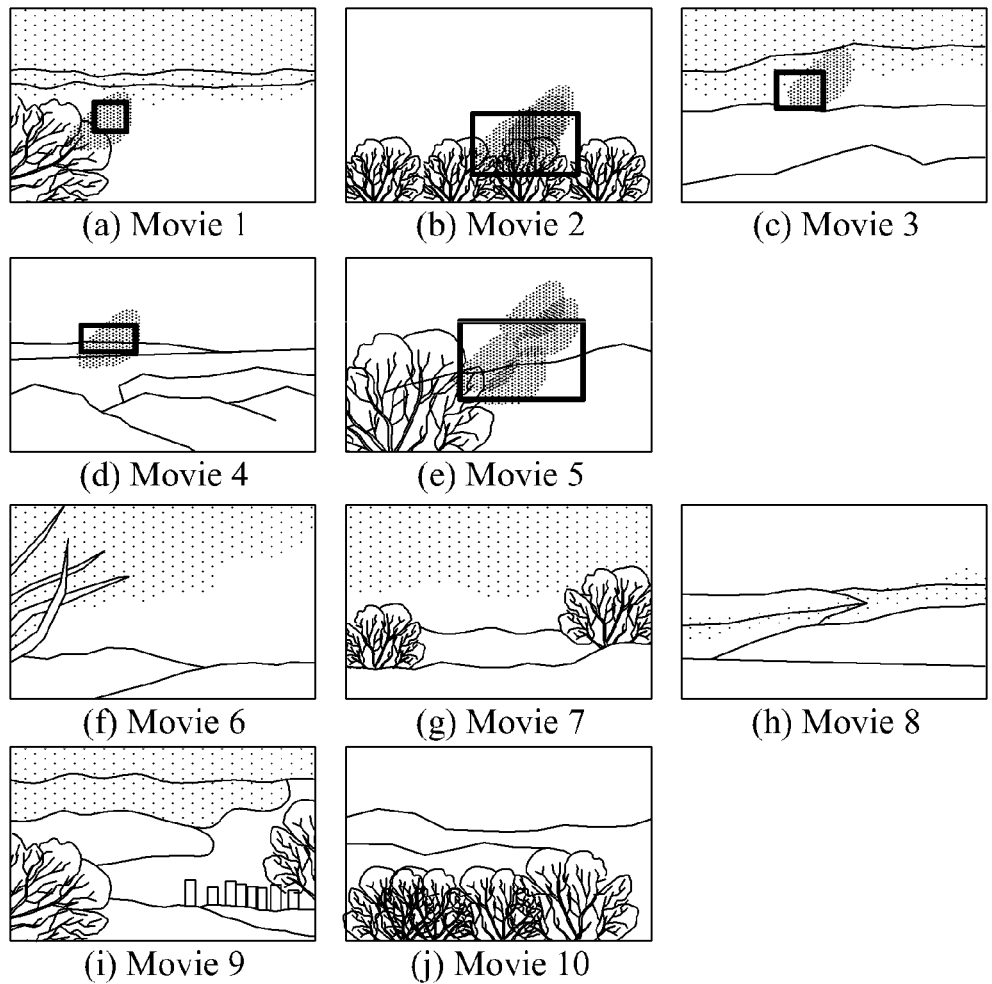
FIG. 12 is a diagram illustrating the results of detection of the smoke of a forest fire using the method of detecting the smoke of a forest fire using the spatiotemporal BoF of the smoke and a random forest according to an embodiment of the present disclosure.

FIG. 12 is a diagram illustrating the results of detection of the smoke of a forest fire using the method of detecting the smoke of a forest fire using the spatiotemporal BoF of the smoke and a random forest according to an embodiment of the present disclosure. As illustrated in FIG. 12, the method of detecting the smoke of a forest fire using the spatiotemporal BoF of the smoke and a random forest according to the embodiment of the present disclosure is capable of reducing false information resulting from the movement of clouds using a random forest classifier and spatiotemporal features. Furthermore, BoF representations represent a video using a collection of local features calculated from a set of 3D volumes, and thus actual smoke can be distinguished from cloud in dynamic motion.

The present disclosure provides the method of detecting the smoke of a forest fire using the spatiotemporal BoF of the smoke and a random forest, which is configured to set one or more key frames from a video sequence, to extract one or more candidate smoke blocks using a nonparametric smoke color model, to extract an HOG and an HOF from the extracted candidate smoke blocks, to generate BoF representations, that is, spatiotemporal features, from the HOG and the HOF, and to perform random forest learning on the generated BoF representations, thereby proving the ability to detect the smoke of a forest fire in real time and to accurately detect the smoke of the forest fire while reducing erroneous warnings.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of detecting smoke of a forest fire using spatiotemporal Bag-of-Features (BoF) of the smoke and a random forest, the method comprising the steps of:
   (1) whenever each frame of a video sequence is input, detecting a difference between the input frame and a previous frame, and setting the input frame as a key frame if the difference exceeds a predetermined first threshold value;
   (2) detecting one or more moving blocks in the set key frame;
   (3) extracting one or more candidate smoke blocks from the moving blocks using a smoke color model;
   (4) generating BoF representations from the detected candidate smoke blocks; and
   (5) determining whether smoke of the candidate smoke blocks is actual smoke by performing random forest learning on the generated BoF representation.

2. The method of claim 1, further comprising, before step (1), the preprocessing step of dividing the frame of the video sequence into a plurality of blocks.

3. The method of claim 2, wherein the preprocessing step comprises dividing the frame of the video sequence into 32×24 blocks.

4. The method of claim 1, wherein step (3) comprises the steps of:
   (3-1) generating a nonparametric probability density function for each of the moving blocks in a saturation and intensity color space using a Gaussian kernel-based density estimation method;
   (3-2) calculating a likelihood of a feature vector of the moving block based on the nonparametric probability density function; and
   (3-3) if the likelihood exceeds a predetermined second threshold value, determining the moving block to be a candidate smoke block.

5. The method of claim 4, further comprising grouping determined candidate smoke blocks into a cluster by connecting the determined candidate smoke blocks with each other.

6. The method of claim 4, wherein the nonparametric probability density function is a multimodal probability density function.

7. The method of claim 5, wherein once all clusters have been determined at step (3-4), one or more clusters having three or fewer blocks may be eliminated.

8. The method of claim 1, wherein step (4) comprises the steps of:
   (4-1) generating 3D volumes by combining the candidate smoke blocks with blocks of a previous frame corresponding to the candidate smoke blocks;
   (4-2) extracting local spatiotemporal features from the generated 3D volumes;
   (4-3) generating a codebook by clustering the extracted local spatiotemporal features; and
   (4-4) generating BoF histograms using the generated codebook.

9. The method of claim 8, wherein step (4-2) comprises the steps of:
   (4-2-1) generating a Histogram Of Gradient (HOG) from a current block; and
   (4-2-2) generating a Histogram of Optical Flow (HOF) from 100 blocks.

10. The method of claim 9, wherein step (4-2) further comprises the step of:
    (4-2-3) normalizing and connecting the generated HOG and HOF.

11. The method of claim 8, wherein step (4-4) comprises the step of generating two BoF histograms for smoke and non-smoke classes, respectively.

12. The method of claim 9, wherein the HOG and the HOF are generated based on a fact that a diffusion direction of smoke rises because of a thermal convection phenomenon.

13. The method of claim 1, wherein step (5) comprises the steps of:
- (5-1) selecting a maximum tree depth of decision trees; and
- (5-2) growing the decision trees.

14. The method of claim 13, wherein step (5) further comprises the step of:
- calculating an average of distribution probabilities of all the trees.

15. The method of claim 13, wherein step (5-2) comprises the steps of:
- (5-2-1) selecting new bootstrap samples from a training set, and growing each unpruned tree using the bootstrap samples;
- (5-2-2) allowing each internal node of the tree to randomly select variables, and determining a best split function using only the selected variables; and
- (5-2-3) growing the tree to the maximum tree depth.

16. The method of claim 13, wherein a number of decision trees is 100.

* * * * *